Oct. 11, 1938.    H. S. JANDUS    2,132,954
BRAKE LEVER AND RATCHET CONSTRUCTION
Filed Dec. 23, 1936    2 Sheets-Sheet 2
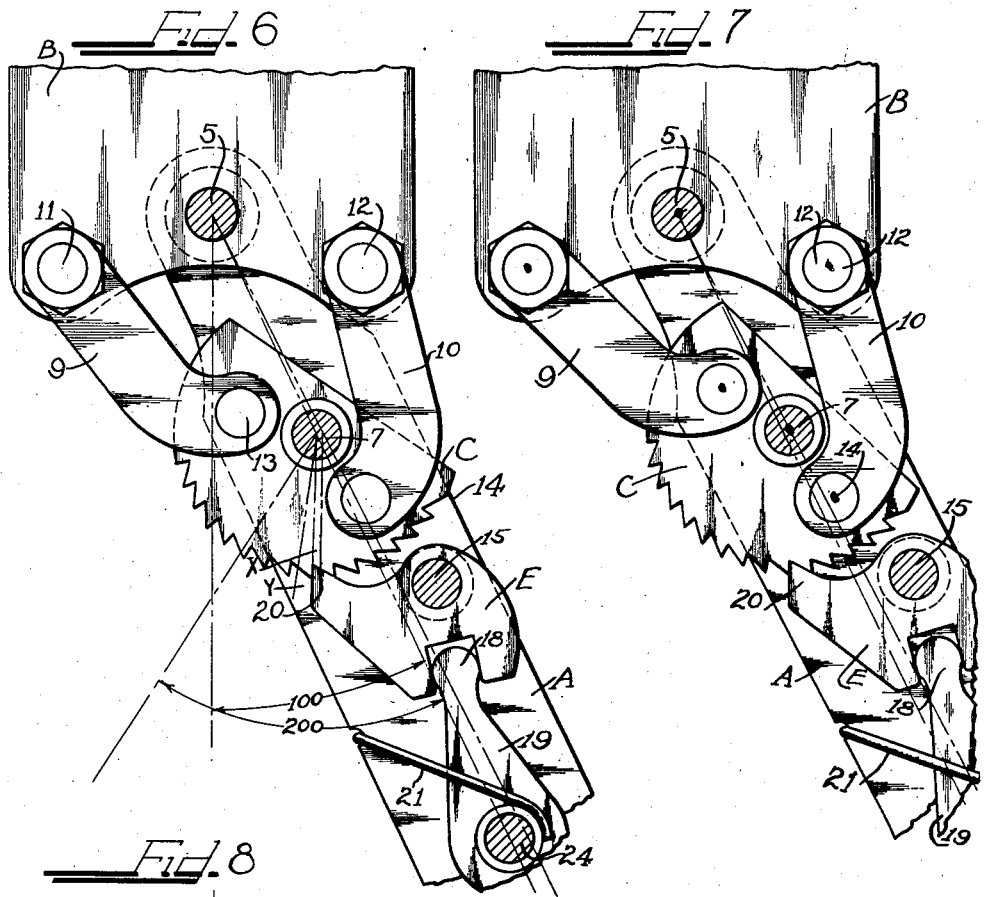
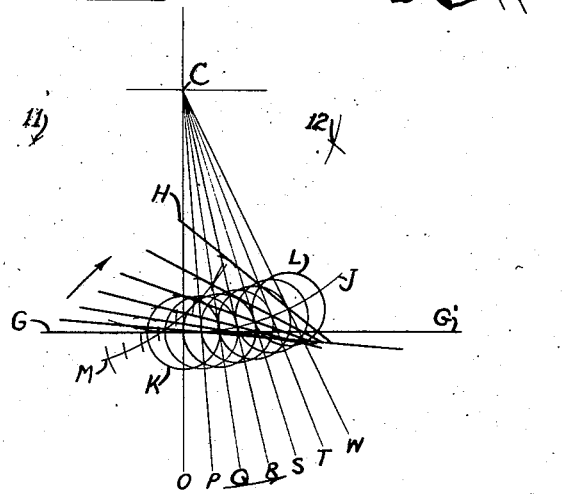
Inventor
HERBERT S. JANDUS
by Charles Bill Attys.

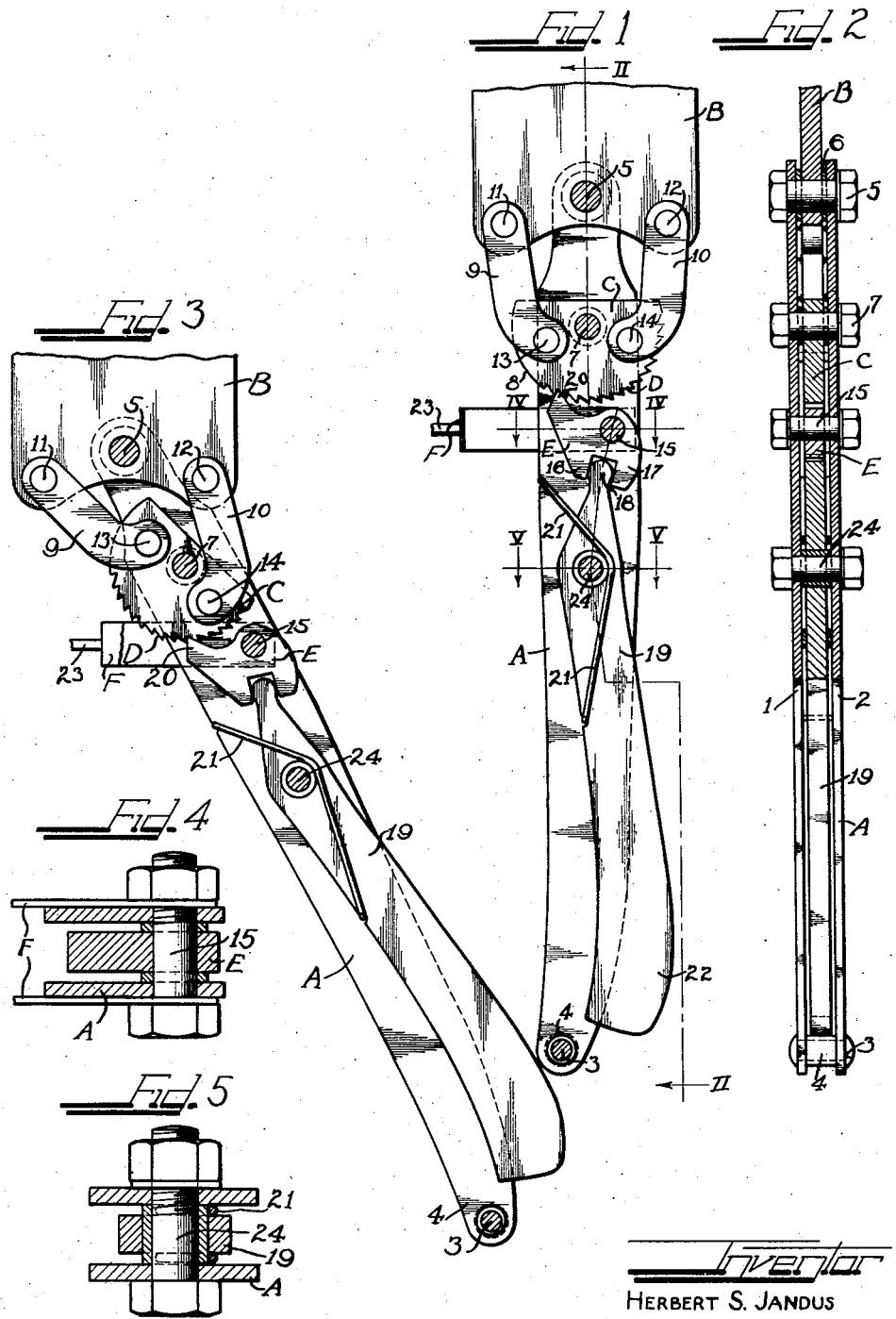

Patented Oct. 11, 1938

2,132,954

UNITED STATES PATENT OFFICE 2,132,954

BRAKE LEVER AND RATCHET CONSTRUCTION

Herbert S. Jandus, Detroit, Mich., assignor, by mesne assignments, to Houdaille-Hershey Corporation, Detroit, Mich., a corporation of Michigan Application December 23, 1936, Serial No. 117,251

5 Claims. (Cl. 74—536)

The present invention relates to brake lever and ratchet construction, and more particularly to a construction wherein the ratchet quadrant is pivoted to the lever and which quadrant is given differential swinging movement with respect to the lever as the lever is swung in use.

It is a well recognized fact, in the use of ratchet type brake levers in automotive vehicles, that often times, in order to move the brake levers to such points as to set the brakes to keep the vehicles from moving, considerable physical effort is necessary. Sometimes, women find it impossible to properly set the so-called "emergency brake levers" to prevent the vehicle from moving thus necessitating leaving the car in gear, which is a practice to be condemned.

Furthermore, the ratchet type brake levers in use at the present time, in order to be applied to effectively prevent the vehicles from moving, especially when parked on a grade, require considerable physical effort to release the levers because of the pressure between the lever pawls and teeth of the ratchets.

The brake lever construction of the present invention obviates and overcomes the above noted objections and enables satisfactory application and release of brakes without excessive physical effort on the part of the vehicle operators.

An object of the present invention is to provide an automotive brake lever construction wherein a finely graduated ratchet adjustment is achieved.

Another object of the present invention is to provide an automotive brake lever construction wherein the ratchet quadrant is carried by the lever and is rocked in angular direction with the swing of the brake lever to thereby achieve such differential action between the quadrant and lever that the amount the lever must be moved to advance its pawl from tooth to tooth of the ratchet is different from the pitch of the ratchet teeth.

A further object of the present invention is to provide a brake lever construction wherein the ratchet quadrant and lever are rocked or swung in such relative manners that the amplitude of movement of the quadrant is greater than the amplitude of movement of the lever for any given lever movement.

Another and still further object of the present invention is to provide brake lever construction for automotive vehicles whereby the lever may be swung to a position to apply the vehicle brake to set position without requiring extreme physical effort on the part of the vehicle operator to effect such braking action.

A still further object of the present invention is to provide a brake lever construction of the pawl and ratchet type, wherein the ratchet and pawl are rockably carried by the lever and wherein the ratchet is rocked in angular direction as the lever is swung in use, and wherein the rate of rock of the ratchet is greater than the rate of swing of the lever, so as to move the ratchet past the pawl at a greater rate of movement than the rate of movement of the pawl with the lever, to thereby reduce the distance the pawl must be moved from tooth to tooth of the ratchet to a distance less than the circumferential distance between the crests of any two adjacent teeth of the ratchet for any given movement of the lever.

The invention has for another object the provision of a brake lever construction whereby pressure between the pawl and an engaged ratchet tooth is decreased below that present in existing types of ratchet type brake levers, so that disengagement of the lever from its latched position with the brakes set is more easily effected.

The invention has for a still further object the provision of a brake lever construction whereby a smaller ratchet quadrant may be employed thus reducing the manufacturing cost of the brake lever.

The above, other and further objects of the invention will be apparent from the following description and accompanying drawings.

The accompanying drawings illustrate brake lever construction employing and embodying the principles of the present invention, and the views thereof are as follows:

Fig. 1 is a view partially in elevation and partially in section of one form of brake lever constructed in accordance with the principles of the present invention, and showing the lever in its normal or "off" or released position.

Fig. 2 is a longitudnial sectional view taken substantially in the plane indicated by line II—II of Fig. 1.

Fig. 3 is an elevational and sectional view of the lever of Fig. 1 showing the lever swung in brake applying direction.

Fig. 4 is an enlarged transverse sectional view taken substantially in the plane indicated by line IV—IV of Fig. 1.

Figure 5 is an enlarged transverse sectional view taken substantially in the plane indicated by line V—V of Fig. 1.

Fig. 6 is an enlarged fragmental view partially in elevation and partially in section showing a lever of the present invention as it is swung toward brake setting position, and showing the relationship of the parts.

Fig. 7 is a view similar to Fig. 6 with the lever swung one tooth farther in brake applying position.

Fig. 8 is a diagrammatic view showing relative movement of certain of the parts of a brake lever of the form shown in Figs. 1–7 inclusive.

The drawings will now be explained:

The illustrated form of brake lever includes a lever member A herein illustrated as comprising side members 1 and 2 which are secured together in laterally spaced relation with the lower end, as illustrated in the drawings, connected by a rivet 3 on which is a spacer 4 between the faces of the members 1 and 2. The other end of the lever is pivoted, by means of a bolt 5, to a fixed plate or support B which may be attached in any suitable manner to a bracket secured to the dashboard of an automotive vehicle, behind the instrument board, if the lever is to be installed as one of the dash type, or attached to or adjacent the transmission casing if the lever is to be installed as one of the regular type.

Suitable washers 6 may be interposed between the inner faces of the members 1 and 2 of the lever, and the plate B.

A ratchet quadrant or floating sector C is pivoted by means of a bolt 7 or like attaching means to the lever a slight distance from the pivot 5 of the lever. The quadrant C is herein illustrated as having an arcuate surface 8 in which are formed a plurality of teeth D, constituting the ratchet.

For rocking the ratchet quadrant C with respect to the lever A, links 9 and 10 are connected to the plate or support B and the quadrant C respectively. The links 9 and 10, at similar ends, are pivoted to the plate B by pins 11 and 12 respectively, while at their other ends they are pivoted to the ratchet quadrant C by pins 13 and 14 respectively.

Referring to the drawings, it will be apparent that the axes of the pivots 11 and 12, of the links are not in horizontal alignment with the axis of the lever pivot 5. Furthermore the axes of the pivots 13 and 14 are out of horizontal alignment with the axis of the pivot 7 of the ratchet quadrant C. By proportioning the ratio of distances between the lever pivot and the link pivots to the ratchet quadrant pivot and the link pivots, it is possible to control the angular movement of the ratchet quadrant, with respect to the angular movement of the lever.

A pawl E is pivoted to the lever A by means of a bolt 15. The pawl, in the present instance, is formed with spaced lugs 16, and 17 forming a gap in which is received the end 18 of an actuating member 19. The pawl has a pointed end 20 adapted to engage any of the teeth of the ratchet D for latching the lever A in desired position. A spring 21 is arranged to act against the actuating member 19 in such manner as to normally maintain the pawl E in latching engagement with the ratchet D of the quadrant C. With the actuating member 19 in normal position, a portion thereof, as at 22 projects outwardly of the handle portion of the lever A so as to be pressed by the palm of the hand of the operator of the vehicle to unlatch the pawl, when it is desired to shift the lever.

A clevis F is shown as connected to the pivot pin 15 of the pawl. It is to be understood, of course, that the clevis might be fastened to some other part of the lever if so desired. To the clevis F is secured a cable or rod 23 which is connected to the brake actuating mechanism of the automotive vehicle.

The actuating member 19 is pivoted to the lever A, by the pivot 24, in such manner that but slight rocking movements of the actuating member 19 will be necessary to rock the pawl E sufficiently to disengage it from the ratchet of the sector C.

The operation of the brake lever construction of the present invention is as follows:

Fig. 1 shows the part in normal or inoperative position, which is that occupied by the lever when the brakes are in released or in off position.

To move the lever in a direction to apply the brakes, as viewed in the drawings, the operator grasps the rear portion of the lever A, near its free end, which is the left-hand portion as viewed in the drawings, and moves it in counterclockwise direction about its pivot 5.

During such movement, the point 20 of the pawl E rides over the teeth of the ratchet quadrant D in the usual manner. During such movement, because of the pivotal connection of the links 9 and 10 to the ratchet quadrant C, the quadrant will be swung in clockwise direction as may be readily observed from an inspection of the drawings.

Because of the positioning of the pivots 11 and 12 with respect to the lever pivot 5 and the pivots 13 and 14 with respect to the pivot 7 of the ratchet quadrant C, the ratchet quadrant will be rocked or swung at a greater rate of speed than the lever A. This differential movement between the quadrant C and the lever A, that is, the lever swinging in one direction and the quadrant in the opposite direction, creates a condition wherein the amplitude of swing of the lever from crest to crest of adjacent teeth of the ratchet is less than the horizontal projection of the pitch of the ratchet teeth. This means that to move the lever from one tooth to the next the amplitude of movement of the lever may be slightly less than the pitch of the teeth. This feature becomes important as the lever nears its end of swing in brake applying direction, where resistance to swing is offered by application of the brakes but which application is insufficient to hold the brakes or prevent movement of the vehicle. It becomes necessary then to swing the lever into engagement with the next notch or tooth, which, because of the differential movement present in the lever construction of this invention may be effected by a slight movement of the lever, which is less than the movement now required by levers of the ratchet type in use at the present time.

Fig. 7 of the drawings is intended to show the relationship of the parts when the brake lever has been swung to its extreme of movement in brake applying position with the brakes locked or set to prevent rolling of the vehicle, should it be parked on an incline. The relationship of the parts shown in Fig. 6 illustrates the parts with the pawl engaging the tooth just ahead of the tooth engaged by the pawl in Fig. 7. In other words the movement of the levers A from the position of Fig. 6 to the position of Fig. 7 is the movement that applies the brakes in an effective manner to prevent rolling of a parked vehicle.

In moving from the position of Fig. 6 to the position of Fig. 7, the horizontal projection of the movement of the point 20 of the pawl E is represented at X in Fig. 6. The amount of rock or swing of the ratchet quadrant C from the position occupied in Fig. 6 to the position occupied in Fig. 7 is represented by the arc Y, taken on the pitch circle of the ratchet quadrant C. The sum of the arc Y and the horizontal projection X is equal to the pitch of the teeth plus a slight clearance sufficient so that the point 20 of the pawl will snap over the crest of one tooth to engage the next tooth.

Referring to Fig. 6, the angle designated by the reference character 100 represents the amplitude of movement of the lever A from its initial position as in Fig. 1, to the position illustrated in Fig. 6. The angle represented by the reference character 200 represents the swing or rock of the ratchet quadrant C in counter angular direction from the position occupied as in Fig. 1 to the position occupied in Fig. 6. As the parts are illustrated in the accompanying drawings, the amplitude or rock or swing of the sector quadrant C is slightly more than twice the amplitude of movement of the lever A, from the position of the lever and quadrant shown in Fig. 1 to the position shown in Fig. 6.

Referring to Fig. 8, which is a diagrammatic figure illustrating movements of certain parts of the brake lever construction of the present invention, C represents the pivotal axis of swing of the lever A. The lines CO to CW inclusive, represent various positions occupied by the center line of the lever A as it is swung from the position of Fig. 1 to the position of Fig. 7.

The line J represents the arc traveled by the axis of the pivot 7 of the sector quadrant C as the lever is swung from the position of Fig. 1 to the position of Fig. 7. The line designated by the reference character M represents the travel of the center line of the pivot 13 connecting the links 9 to the sector quadrant C as the lever is swung as heretofore stated. The line GG' represents the normal position of the ratchet quadrant C when the lever is in the position of Fig. 1. The angular lines illustrated in Fig. 8 represent the different angular positions assumed by the sector quadrant C as the lever is swung from the position of Fig. 1 to the position of Fig. 7. The final line H represents the position of the sector quadrant C when the lever is in the position of Fig. 7.

It is thought that Fig. 8 properly presents the difference in angular movement of the sector quadrant C and the lever A as the lever is swung from the position of Fig. 1 to the position of Fig. 7.

When the lever is swung from the position of Fig. 7 to the position of Fig. 1, the movement will be in the opposite direction, the sector quadrant C returning to assume its normal horizontal position of Fig. 1 and the lever to assume its normal or vertical position of Fig. 1.

By means of the present invention, a finely graduated ratchet adjustment is attained. This adjustment is attained without regard to the sizes of the teeth of the ratchet. It is possible to construct the sector quadrant of stamped metal, of material with a minimum thickness of approximately one-eighth of an inch. Such a quadrant would easily carry the necessary load on any one of its teeth without fear of breakage. Furthermore, the quadrant may be made smaller than quadrants of the present type thus reducing cost of manufacture of the quadrant as the smaller quadrant provides a minimum amount of metal to be heat treated.

It has been found by experimentation that the tooth pressure in a brake lever of the present invention is less than it is in a ratchet type brake lever of conventional form.

The ratchet type brake lever of conventional form, in use on the "Ford" motor car with a one hundred pound pull on the brake rod develops a tooth pressure of approximately 108 pounds. Using a lever of the present invention of the form illustrated in Figs. 1–7 inclusive, with a pull on the brake rod of 100 pounds, the tooth pressure has been found to be 73.3 pounds. It is therefore obvious that because of the reduction in tooth pressure achieved by a brake lever of the present invention it will be easier to disengage the pawl from its ratchet to release the brake, than it is with the ratchet type levers of conventional form in use at the present time.

By reason of the fact that the tooth pressure is reduced, the thickness of the ratchet quadrant may be reduced so that it may easily be made from a stamping.

It has been found by experimentation that a pull on a brake rod of a thousand pounds produces a tooth pressure of 733 pounds. A tooth made from a sector quadrant of one-eighth inch in thickness could easily carry this load on a single tooth.

It will thus be obvious that the present invention provides a brake lever construction wherein the incremental movement of the pawl on the lever in applying the brakes is different from the pitch of the teeth of the ratchet so that to attain the final movement of the lever to a position to hold a vehicle from rolling when parked on an incline, may represent the difference between two adjacent teeth of the ratchet. With the differential movement of the ratchet quadrant and lever of the present invention, this final lever movement may be accomplished by an angular swing of the lever which is less than the distance between the crests of any two adjacent teeth.

It is to be understood that the illustrated lever is constructed otherwise than it would be in commercial production. The lever, as well as the actuating member, and other parts, might be made of stampings with the handle portion of the lever suitably rounded to afford a convenient and comfortable grip for the hand of the operator.

The links, as well as the intermeshing teeth of the plate and ratchet constitute means, or connections, for driving or moving the ratchet, with respect to the lever, as the lever is swung about its pivotal connection to said plate. Any other means suitable for the same purpose could as readily be used if so desired.

The invention has been described herein more or less precisely as to details, yet it is to be understood that the invention is not to be limited thereby as changes may be made in the arrangement and proportion of parts, and equivalents may be substituted, without departing from the spirit and scope of the invention.

The invention is claimed as follows:

1. Brake lever construction including a support, a lever pivoted to said support to swing, a sector pivoted to said lever and having ratchet teeth along a margin thereof, a pawl pivoted to said lever for engagement with said ratchet teeth to hold said lever in adjusted position, and connecting means between said support and said sector to rock said sector about its pivot in angular direction opposite to the direction of angular movement of the lever, said connecting means being such that when said lever is moved in brake applying direction the sector is moved with accelerated motion to reduce the amount of incremental movement of the lever necessary to the passage of the pawl from tooth to tooth of the ratchet to less than the pitch of the ratchet teeth.

2. Brake lever construction including a fixed support, a lever pivoted to said support to swing, a ratchet sector pivoted to said lever and having ratchet teeth along a margin thereof, a pawl pivoted to said lever for engaging said ratchet teeth, linkage between said support and said sector for rocking said sector about its pivot in angular direction opposite to the direction of angular movement of said lever as said lever is swung to vary the inclination of the sector to decrease the incremental movement of the lever to a point where such lever movement per tooth is different from the pitch of the ratchet teeth.

3. Brake lever construction including a lever pivoted to a fixed support to swing, a ratchet pivoted to said lever, a pawl pivoted to said lever to engage said ratchet, links connecting said support and ratchet, said links at similar ends being pivoted to said plate on opposite sides of the lever pivot in other than horizontal alignment and at the other ends pivoted to the ratchet on opposite sides of the ratchet pivot in other than horizontal alignment with the ratchet pivot to cause said ratchet to swing about its pivot in angular direction counter to the direction of angular swing of the lever, said links causing the rate of angular movement of said ratchet to be different from the rate of angular movement of said lever.

4. Brake lever construction including a fixed support, a lever pivoted to said support, to swing, a ratchet quadrant pivoted to said lever, a pawl pivoted to said lever for engaging the ratchet, link connection between said support and quadrant to rock said quadrant about its pivot in angular direction opposite to the direction of angular movement of the lever and at a different speed, the arrangement being such that the amplitude of rock of the ratchet quadrant is greater than the amplitude of swing of the lever for any given movement of the lever.

5. Brake lever construction including a lever pivoted to a fixed support to swing, a ratchet member pivoted to said lever, a pawl pivoted to said lever to engage said ratchet, a connection between said support and said ratchet and pivoted to the latter, said connection causing differential angular movement of said ratchet and lever such that the angular movement of said ratchet in relation to said pawl is greater than the angular movement of said lever in relation to said fixed support.

HERBERT S. JANDUS.